US007000044B2

(12) United States Patent
Ueno

(10) Patent No.: US 7,000,044 B2
(45) Date of Patent: Feb. 14, 2006

(54) ELECTRONIC CAMERA AND DATA TRANSMISSION SYSTEM

(75) Inventor: Akira Ueno, Akiruno (JP)

(73) Assignee: Olympus Corporation, Tokyo (JP)

( * ) Notice: Subject to any disclaimer, the term of this patent is extended or adjusted under 35 U.S.C. 154(b) by 644 days.

(21) Appl. No.: 09/961,925

(22) Filed: Sep. 24, 2001

(65) Prior Publication Data

US 2002/0051062 A1 May 2, 2002

(30) Foreign Application Priority Data

Sep. 25, 2000 (JP) ............................ 2000-289961

(51) Int. Cl.
*G06F 13/42* (2006.01)

(52) U.S. Cl. .......................... 710/105; 710/33; 710/52; 710/106

(58) Field of Classification Search .................. 710/29, 710/33, 52, 105, 106, 58–60; 345/502, 506
See application file for complete search history.

(56) References Cited

U.S. PATENT DOCUMENTS 5,709,209 A * 1/1998 Friemel et al. ............. 600/447
5,828,383 A * 10/1998 May et al. .................. 345/546
6,105,083 A * 8/2000 Kurtze et al. ................. 710/29
6,166,748 A * 12/2000 Van Hook et al. .......... 345/522

* cited by examiner

*Primary Examiner*—Ilwoo Park
(74) *Attorney, Agent, or Firm*—Straub & Pokotylo; John C. Pokotylo

(57) ABSTRACT

A data transmission system or an electronic camera in which data is transmitted from a first block to a second block is disclosed. A requesting means notifies from the second block, a request of receiving data from the first block at least in predetermined units thereto. A reserving means notifies, from the first block, the readiness of outputting data to the second block, in predetermined units thereto. A data outputting means outputs, from the first block, data to the second block on the basis of the notifications from the requesting means and the reserving means. Thus, it is possible to efficient and effective data transmission between two data processing blocks.

21 Claims, 8 Drawing Sheets

| ENLARGING/ CONTRACTION MODE | DATA UNIT | | | |
|---|---|---|---|---|
| | I1 | O1/I2 | O2/I3 | O3 |
| 1/2CONTRACTION | 27 | 24 | 19 | 8 |
| DOUBLY ENLARGE (WITH LPF) | 15 | 12 | 7 | 8 |
| ENLARGE BY 2 (WITHOUT LPF) | 10 | 7 | - | 8 |

ELECTRONIC CAMERA AND DATA TRANSMISSION SYSTEM

BACKGROUND OF THE INVENTION

This application claims benefit of Japanese Patent Application No. 2000-289961 filed on Sep. 25, 2000, the contents of which are incorporated by the reference.

The present invention relates to data transmission system and method effectively applicable to data transmission system such as an electronic camera, in which data is transmitted from a certain processing block for performing data processing or a buffer to the next stage processing block or buffer.

Data transmission between two processing blocks has heretofore been performed as follows. As shown in FIG. 12, data is to be transmitted from a first block to a second block, the first block notifies a data transmission request to the second block, then obtains a permission from the second block, and then transmits the data. However, when it becomes impossible to transmit data to the second block, for instance when the data reception capability of the second block becomes zero so that data can no longer be written therein, the data to be transmitted to the second block has to be held at the first block side output side terminal. This means that a data holding memory has to be provided at the first block output terminal. When the first block sends out a data transmission request to the second block afresh and responsive to receipt of a permission from the second block, the remaining data (or all the data) is transmitted from the first block.

As shown, in the prior art, even when the succeeding stage processing block is in a state of permitting the writing of data, a desired quantity of data may not always be transmitted, and for this reason a memory for holding data to be transmitted should be provided at the output terminal of the preceding stage processing block. In addition, when the succeeding stage processing block becomes incapable of writing data during data transmission, a waiting time is brought about after the notification of a new data transmission request till the permission of writing data is obtained. A time lag is therefore caused, which is undesired for efficient data transmission.

As shown above, the prior art data transmission has the problems that a memory having a data capacity corresponding to the data to be transmitted should be provided on the preceding processing block output side and that it is impossible to obtain efficient data transmission.

SUMMARY OF THE INVENTION

An object of the present invention is to provide a data transmission system, method and an electronic camera with the same, which permit efficient and effective data transmission between two data processing blocks.

According to an aspect of the present invention, there is provided an electronic camera in which data transmission system in which data is transmitted from a first block to a second block, comprising: a requesting means for notifying from the second block, a request of receiving data from the first block at least in predetermined units thereto; a reserving means for notifying, from the first block, the readiness of outputting data to the second block, in predetermined units thereto; and a data outputting means for outputting, from the first block, data to the second block on the basis of the notifications from the requesting means and the reserving means.

The electronic camera further comprises a selector for selecting or connection switching a block to be connected to the first block among a plurality of image processing blocks and setting the selected block to be the second block.

According to an aspect of the present invention, there is provided a data transmission system in which data is transmitted from a first block to a second block, comprising: a requesting means for notifying from the second block, a request of receiving data from the first block at least in predetermined units thereto; a reserving means for notifying, from the first block, the readiness of outputting data to the second block, in predetermined units thereto; and a data outputting means for outputting, from the first block, data to the second block on the basis of the notifications from the requesting means and the reserving means.

The first and second blocks each include either a buffer for transferring data or a processing block for operationally processing input data. The requesting means notifies a request when it is possible to receive data in excess of predetermined units. The requesting means refrains from sending out any request notification when processing in the second block has been ended or the input of data in excess of predetermined units is not permitted. The reserving means sends out the readiness notification to the second block when a request of receiving data is notified from the data requesting means and data output in predetermined units is permitted. The reserving means refrains from sending out any request notification to the second block when no request of receiving data has been notified from the requesting means. The first block or the second block is capable of executing at least an image processing operation. The requesting means requests data in first predetermined units, and the reserving means outputs data in second predetermined units different from the first predetermined unit. The data transmission system further comprises a mode setting means for setting a transmission mode corresponding to the kind of data to be transmitted, the units of the data in the first predetermined unit and the data in the second predetermined unit being set on the basis of a mode set in the mode presetting means. The data outputting means outputs data for every second predetermined unit in response to the notification from the reserving means. Even when the data reception capability of the second block is less than predetermined units, the requesting means outputs a request signal upon exceeding of a predetermined value by the data reception capability of the second block so long as data outputted from the second block prevails. Even when a predetermined value has not been reached by the quantity of data capable of being outputted from the first block, the reserving means outputs a preservation signal upon exceeding of a predetermined value, during the reception by the first block of the data outputted from the second block, by the output data. A plurality of blocks including the first and second blocks are serially connected in a row. The data outputting means outputs, together with data, a data certification signal.

Other objects and features will be clarified from the following description with reference to attached drawings.

PREFERRED EMBODIMENTS OF THE INVENTION

Preferred embodiments of the present invention will now be described with reference to the drawings.

Figure 1:
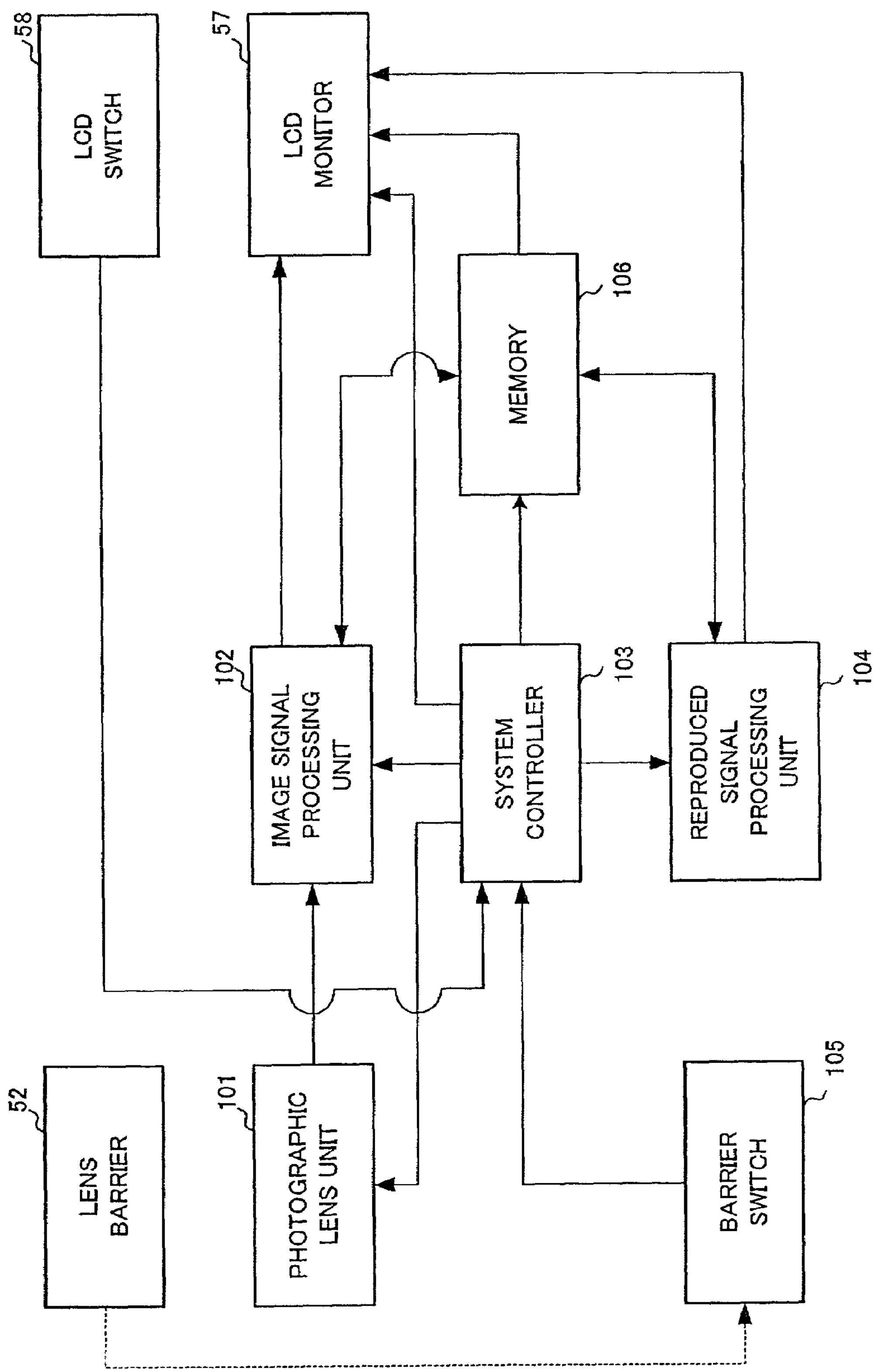
FIG. 1 is a block diagram showing the configuration of a major portion of an electronic camera 51 with a barrier according to an embodiment of the present invention.

FIG. 1 is a block diagram showing the configuration of a major portion of an electronic camera 51 with a barrier according to an embodiment of the present invention. The camera comprises a system controller 103 for controlling of the entire camera, a photographic lens unit 101 in which photographic lenses, an imaging device, an automatic focus/diaphragm adjustment device, a shutter, and the other components are provided, a frame memory 106 (referred as memory) for tentatively storing the pre-processed image signal from the imaging device, an image processing unit 102 for reading out from the memory 106 and image-processing on an image signal read out from the imaging device, and outputting again the resultant data to the memory 106, a reproduced signal processing unit 104 for reading out the image data from the memory 106 and outputting the image data to an LCD monitor 57 as a display, an LCD monitor 57 for switching and displaying a preview image outputted from the image signal processing unit 102 and a reproduced image data stored in the memory 106, a lens barrier 52 capable of sliding between a closed position and opened position at which the photographic lenses are closed and open, a barrier switch 105 to be turned on or off responsive to an opening or closing movement by the barrier 52, and an LCD switch 58 which is a switching mechanism for switching display states of the LCD monitor 57.

In the above camera, when the lens barrier 52 slides to an open position, the barrier switch 105 is turned on. An output signal of the barrier switch 105 is inputted to the system controller 103, and the electronic camera 51 is set to a photography mode. In the photography mode, an image signal representing an object image obtained by the photographic lens unit 101 stored in the memory 106 and the read out signal from the memory 106 is processed by the image signal processing unit 102. Resultant image data is displayed on the LCD monitor 57 as a preview image. On the other hand, the photographed image data is again stored in the memory 106.

When the lens barrier 52 slides to the closed position, the barrier switch 105 is turned off. The off-state signal is inputted to the system controller 103, suspending the photography mode. If the LCD switch 58 is on, the camera is set to the reproduction mode. In the reproduction mode, the photographed image data stored in the memory 106 is read out by the reproduced signal processing unit 104, and supplied to the LCD monitor 57 for displaying a reproduced image. The reproduction mode may be a processing mode in which the image data obtained by an external image processing apparatus is displayed on the LCD monitor 57.

An automatic focus control unit, automatic exposure control unit, shutter control unit provided in the system controller 103 control automatic focus (AF) drive to be performed, photometry, diaphragm drive, and shutter drive in the photographic lens unit 101.

Next, the electronic camera 51 with the barrier shown in FIG. 1 according to the embodiment of the present invention will be described.

Figure 2:
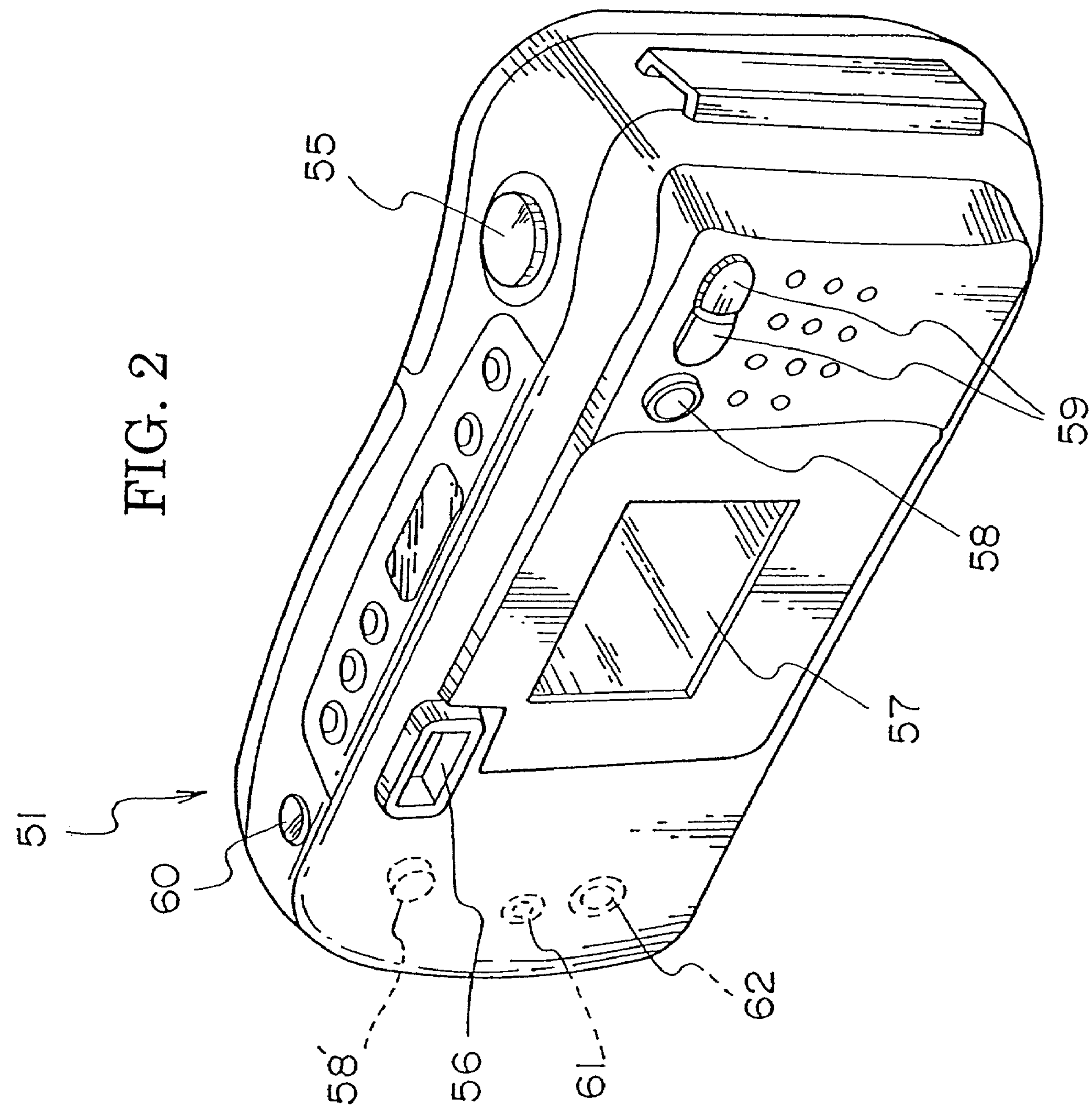
FIG. 2 is an oblique view showing the back appearance of the electronic camera 51 shown in FIG. 1.
Figure 3:
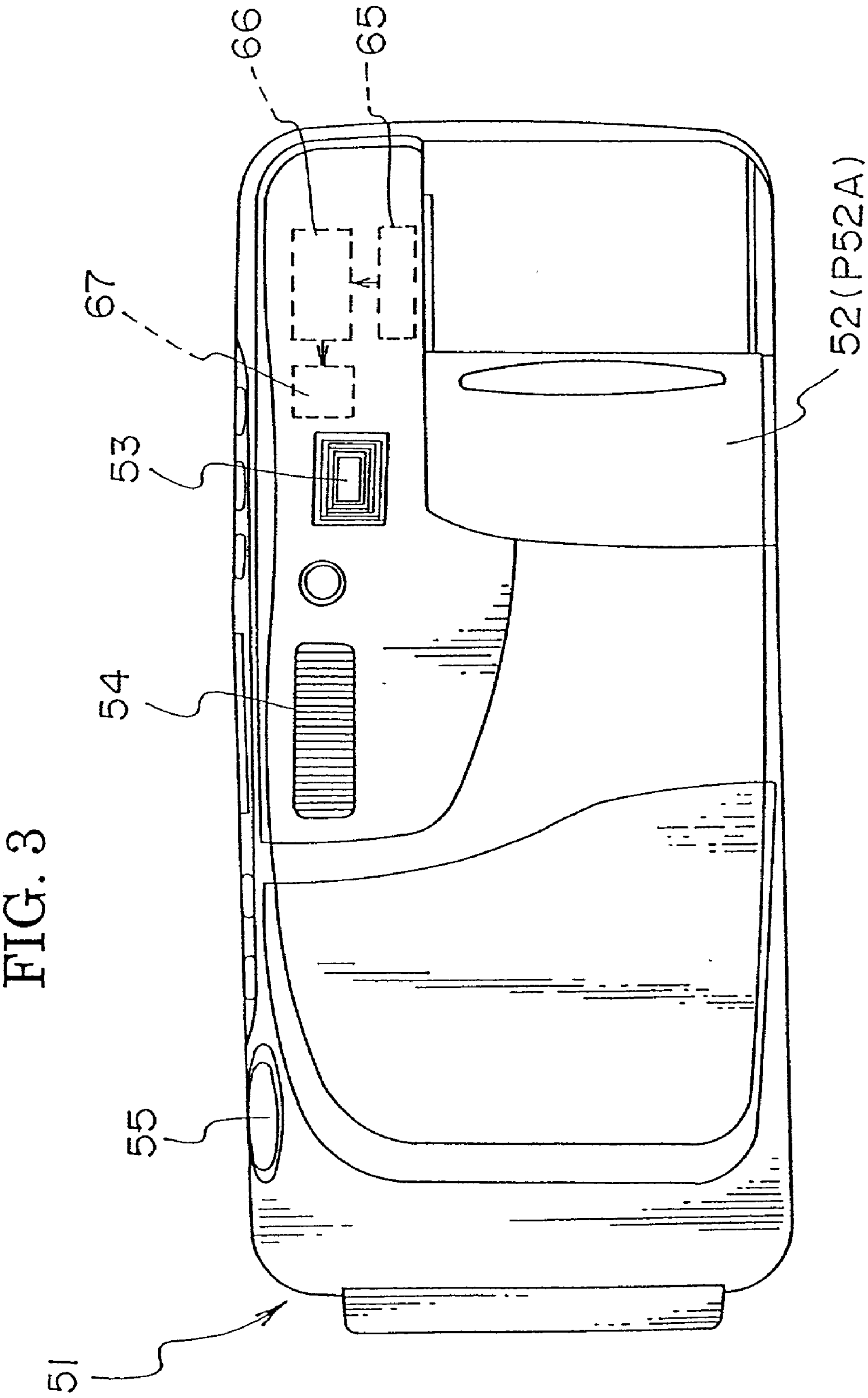
FIG. 3 is a front view of the electronic camera with the lens barrier 52 set to a closed state shown in FIG. 1.
Figure 4:
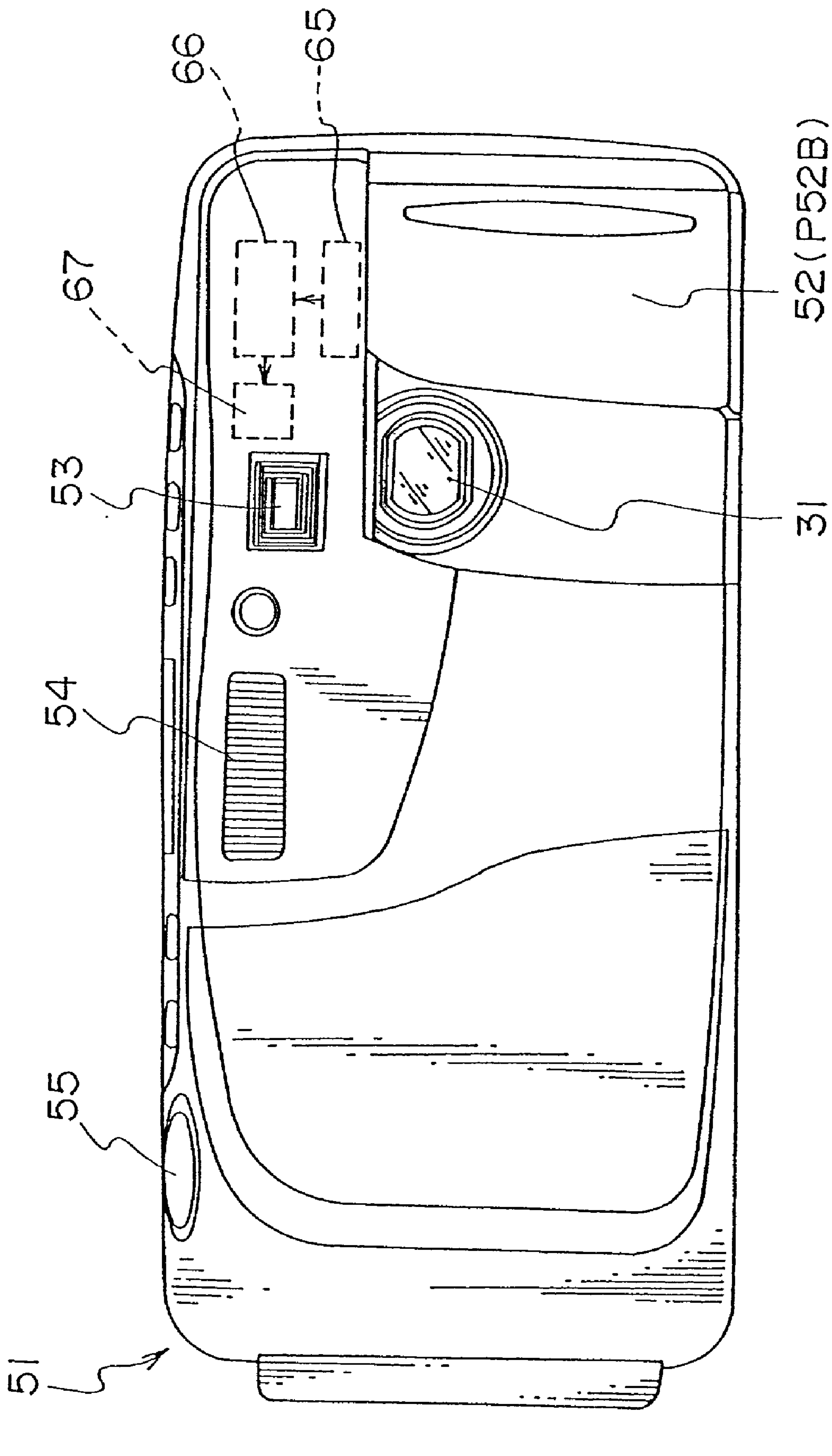
FIG. 4 is a front view of the electronic camera with the lens barrier 52 set to an opened state shown in FIG. 1.

FIG. 2 is an oblique view showing the back appearance of the camera 51. FIGS. 3 and 4 are front views of the electronic camera with the lens barrier 52 set to a closed state and opened state respectively.

On the face of the electronic camera 51 provided are the barrier 52 capable of moving or sliding the photographing lens 31 to a closed position P52A or opened position P52B. Responsive to the opening or closing movement, the barrier switch 105 provided in the camera is turned on or off. An output signal of the barrier switch 105 is inputted to the system controller 103 for controlling the drive of the motor or electromagnet. Also located on the face of the electronic camera 51 are a view finder window 53 and a strobe window 54.

On the back of the electronic camera 51 provided are a view finder 56, the LCD monitor 57 for displaying the photographed image as a through picture of the CCD, a reproduced image of the photographed image, or information of various characters, the LCD switch 58 located at a position, which permits a user to handle the LCD switch easily with the thumb of his/her right hand holding the camera, on the right hand of the LCD monitor 57, and a frame selection switch 59 used to select a frame to be reproduced during reproduction of an image.

On the top of the electronic camera 51 provided are a release switch 55 capable of being handled with the index finger of a hand holding the electronic camera 51, a size selection switch 60 for selecting the image enlarge/contract size, and other operation switches. Moreover, an external power supply connector 61 via which another battery can be connected, and a communication connector 62 via which a personal computer or the like can be connected are provided on the left-hand area on the back of the camera.

Since the external power supply connector 61 and communication connector 62 to which cables are connected are provided in the left-hand area on the back of the electronic camera 51, even when the electronic camera 51 is held with a right hand with the cables connected to the connectors, the cables will not interfere with the right hand.

As shown above, in this electronic camera 51, the opened-closed state of the barrier 52 is detected by using the output of the barrier switch 105 which is cooperative to the barrier 52. When the barrier 52 is "opened", the photographing mode is selected. When the barrier is "closed", and the LCD switch 58 is "on", the reproduction mode is automatically selected. Mode setting thus can be obtained smoothly and easily, which is desired from the readiness-of-use standpoint. It is also possible to arrange the LCD switch 56 is operable such as to select the photographing mode or the reproduction mode to perform the displaying, on the LCD monitor 57, thorough images photographed with the CCD or the display reproduction images of image data recorded in the memory.

Figure 7:
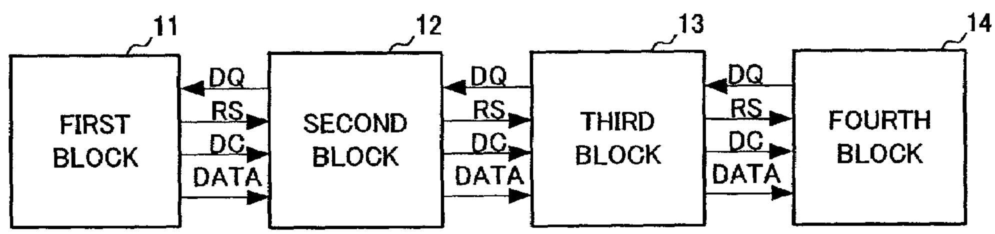
FIG. 7 is a block diagram showing an embodiment data transmission system according to the present invention.

FIG. 7 shows an embodiment data transmission system according to the present invention. The data transmission system comprises serially connected four blocks in which data is transmitted through the successive blocks from the first one 11 to the fourth one 14. Referring to FIG. 7, data is transmitted in the same way from the first block 11 to the second block 12, from the second block 12 to the third block 13 and from the third block 13 to the fourth block 14, and the case of data transmission from the first block 11 to the second block 12 will be described. The first to fourth blocks 11 to 14 may be chips or like elements for actually executing the data processing, or they may be input/output buffers for transferring the data as well. In the embodiment of the present invention, these elements are merely referred to as "blocks".

Referring to FIG. 7, the second block 12 outputs a request signal DQ to the first block 11, and the first block 11 outputs a reservation signal RS, a data certification signal DC and output data DATA to the second block 12. Details of the individual signals are as follows. The request signal DQ is a signal of requesting, to the first block 11, data necessary for processing, and indicates the presence of a vacant capacity permitting the reception of data in excess of predetermined units necessary for the processing. Where the second block 12 is a mere buffer, the request signal DQ indicates that data in excess of predetermined units can be transferred. The reservation signal RS is a signal of notifying, to the second block 12, data indicative of outputting a complete set of data. The data certification signal DC is a signal of making the data output to be effective. The output data DATA is actually transmitted data for processing.

Figure 8:
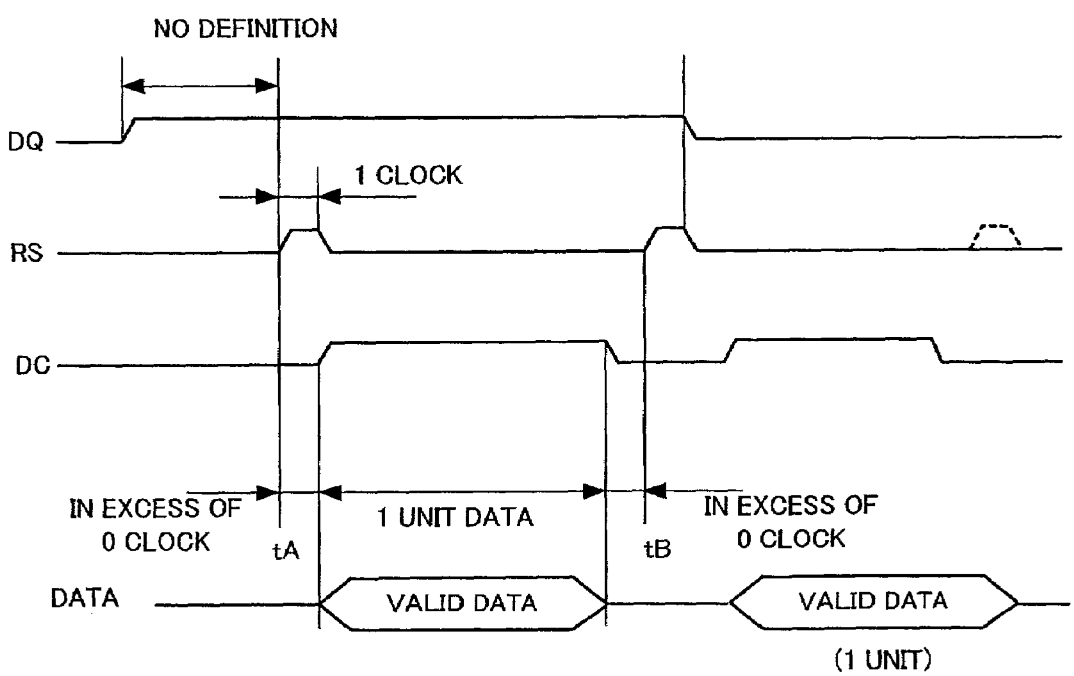
FIG. 8 is a timing chart showing the data transmission according to the embodiment of the present invention.

The manner of data transmission from the first block 11 to the second block 12 will now be described with reference to the timing chart of FIG. 8. According to the present invention the data to be transmitted has a fixed length; for instance, one line of image data is transmitted as a complete set of data. One line of data will be hereinafter referred to as data unit of "one data block" (shown as "valid data").

The second block 12 self-checks whether it can now receive the data from the first block 11. Also, when the second block 12 receives, for instance, an instruction for processing the data or a data transfer command (the "data transfer" is hereinafter referred to as "processing" because it is part thereof), it surveys its vacant capacity. When the second block 12 can now receive the data from the first block 11, it turns on the request signal DQ. In the following description, when signal is in the raised state, this state is referred to as "on state". When the signal is in the fallen state, on the other hand, this state is referred to as "off state". The request signal DQ is held in the "on state" until the second block 12 decides that the vacant capacity is no greater than one data block as will be described later or until data to be processed is no longer present (i.e., until an end is brought to the processing).

Thus, while the request signal DQ from the second block 12 prevails, the first block 11 decides that it can output data, and outputs the reservation signal RS to the second block 12 (time tA) so long as the output data DATA to be transmitted from the first block 11 to the second block 12 is present. One clock afterwards, the first block 11 outputs the data certification signal DC and data DATA (shown as "valid data") synchronized thereto to the second block 12. At this time, some vacant capacity is still present, and the request signal thus remains in the "on state". Here, a basic operation unit for the data processing is expressed as "1 clock". When the second block 12 receives the reservation signal RS while the vacant capacity has been reduced to only one data block by receiving one (a complete set of) data DATA (time tB), the request signal DQ is inverted to the "off state" in synchronism to the reservation signal RS. Thus, no subsequent data DATA can be inputted until production of the vacant capacity for one data block. This means that, for instance, the reservation signal RS shown by dashed line becomes invalid (or can not be outputted). One clock after the output of the reservation signal RS inputted to the second block at the time of tB, the data certification signal DC and data synchronized thereto are inputted. When the second block 12 becomes ready to receive the data from the first block after ending data processing therein and transferring data to the third block 13, the request signal DQ is again inverted to the "on state" to be ready for receiving the reservation signal RS.

While in the above description the data certification signal DC is outputted one clock after the reservation signal RS, the capacity of receiving the reservation signal RS means the capability of receiving a complete set of data. Thus, it is possible as well to output data DATA simultaneously with the reservation signal RS and in synchronism to the data certification signal DC.

As shown above, in this embodiment since the data is transmitted while confirming the vacant capacity in excess of one data block, it is possible to realize reliable data transmission and omit a memory for tentative escape of data on the output side of the preceding stage block (i.e., first block) at the time of occurrence of a transmission error (i.e., when writing of data is disabled during the data transmission).

While in this embodiment with a vacant capacity of the succeeding stage block (i.e., second block) in excess of one data block the request signal DQ is turned to the "on state" to notify, to the preceding stage block (i.e., first block), it is possible to receive data. However, this requires a vacant capacity in excess of one data block, which is undesired for the effective utilization of the memory (i.e., input/output buffer). To overcome this drawback, it is possible to turn the request signal DQ or the reservation signal RS to the "on state" in the following timing.

A case is now considered, in which one data block consists of 10 data sub-blocks. It is also assumed that although the second block 12 now has no vacant capacity for reception, it is outputting data to the third block.

Since the second block 12 has no vacant capacity for one data block at this time, it can not output the request signal DQ to the first block 11 until all data of one data block from the second block 12 has been transmitted to the third block. If one block is necessary for the transmission of one data sub-block in such a case, the request signal DQ cannot be outputted during a subsequent 10-clock interval as transmission time required for the transmission of one data block. According to the present invention, however, even when the second block 12 has a vacant capacity less than one data block, the third block 13 can reliably receive the data outputted from the second block 12 to it so long as the data is being outputted. This means that even without the vacant capacity corresponding to one data block, the second block 12 can receive data from the first block 11 to the third block 13 in a quantity corresponding to the quantity of data outputted from it.

It is thus effective for eliminating the time lag to turn the request signal DQ to the "on state" at the time when one data sub-block of data has been outputted. In actual control, however, the transmission data quantity may vary depending on loading state of the transmission line. For this reason, the request signal DQ may be turned to the "on state" when the second block 12 has outputted, for instance, 5 data sub-blocks of data to the third block 13. The timing of turning on the request signal DQ may be varied in dependence on the loading state of the transmission line.

In the meantime, at the time when the reservation signal RS is turned on, the data certification signal DC may not be outputted simultaneously with the reservation signal RS. For example, in the case in which the data certification signal DC is outputted from the preceding stage block (i.e., first block) after a processing delay time corresponding to, for instance, 3 blocks from the output of the reservation signal RS, the succeeding stage block (i.e., second block) waits the data transfer for at least 3 blocks until the commencement of reception of the pertinent data certification signal DC, which is undesired for efficient data transmission. To reduce this time of waiting data and permit more efficient data transfer, it is preferred to turn on the reservation signal RS before the production of a vacant capacity in predetermined units in the preceding stage block input buffer (for instance 4 to 5 clocks beforehand) from the consideration of the time from the turning-on of the reservation signal RS till the turning-on of the data certification signal DC (for instance time corresponding to 3 clocks in this case).

As for the timing of turning on the reservation signal RS, like the case of the timing of turning on the request signal DQ as above, for eliminating the time lag in the data transfer all data DATA of one data block may not have been outputted before outputting the reservation signal RS. That is, according to the present invention it is possible to reliably output the data. Thus, the reservation signal RS is turned on to be ready for outputting data before the outputting of all of one data block data, for instance when 5 data sub-blocks has been outputted. By so doing, it is necessary to wait only 5 blocks of outputting of 5 data sub-blocks, compared to the above case, in which waiting 10 clocks of outputting one data block data was necessary until turning on the reservation signal RS. In this way, the time lag, and hence the time between adjacent data transmissions, can be reduced. Here, a dual port is necessary. In the case of outputting the request signal DQ with vacant capacity DQ less than a predetermined value, a single port structure is sufficient.

Figure 9:
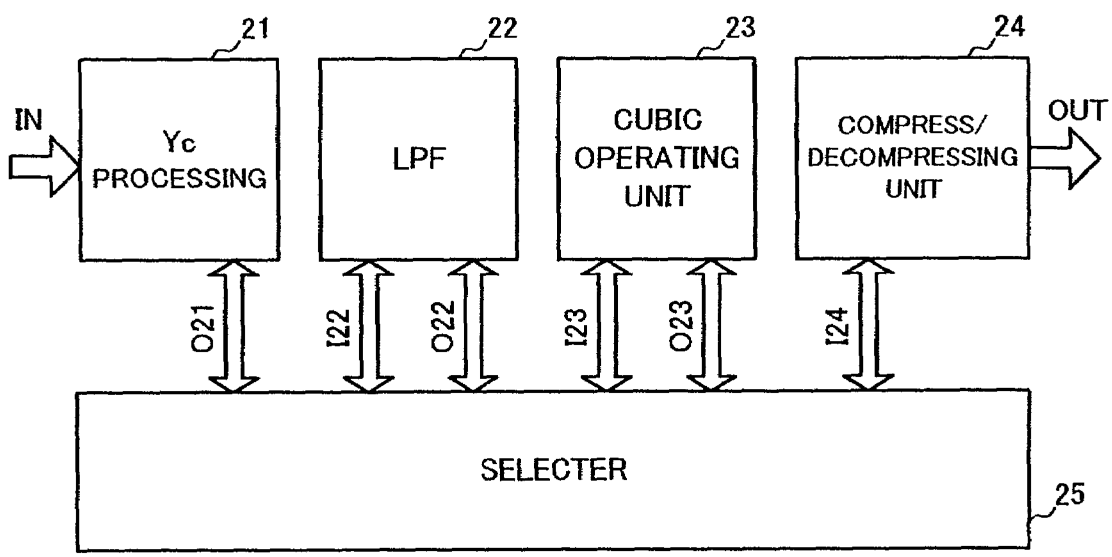
FIG. 9 is a block diagram of the image processor 102 in the electronic camera shown in FIG. 1 according to the present invention.

An application example of the present invention will now be shown. FIG. 9 is a block diagram of the image processor 102 in an electronic (still) camera shown in FIG. 1 which is an application of the present invention.

Referring to FIG. 9, the illustrated image processing unit 102 according to the present invention comprises a Yc processor 21, an LPF (low-pass filter) 22, a cubic operational part 23 and a compressor/decompressor 24. The Yc processor 21 converts RGB data to Yc data.

The Yc processor 21 interpolates and converts R, G and B data, which are obtained from the output of a single-plate photographing element constituted by a CCD or a CMOS using R, G and B primary color filters in a Bayer array, to Y, Cb and Cr data as Yc data, i.e., luminance and color difference signals. The LPF 22 removes harmonic components in the image converted to the Yc data. The cubic operational part 23 executes operations of a cubic interpolation processing when enlarging or contracting image.

Figures 5, 6:
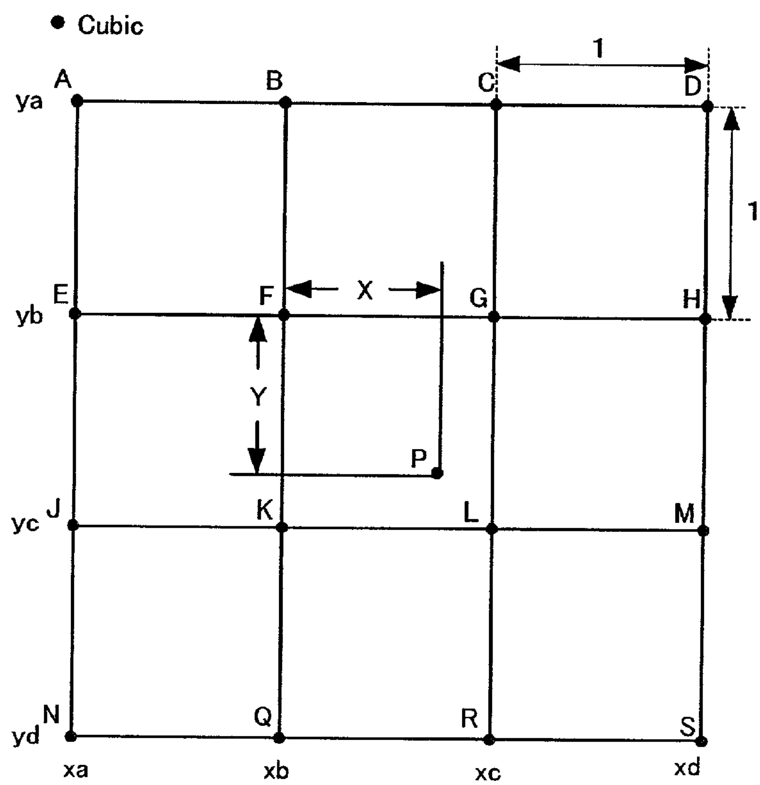
FIG. 5 is a diagram showing the cubic interpolating process.
FIG. 6 is a drawing for explaining the selection operation of selecting enlarged/contracted size of image by operating the size selection switch 60.

In the cubic interpolating process, as shown in FIG. 5, the image data at a given point P is obtained using image data at 4×4=16 points A to S, points xa, xb, xc and xd are expressed as X for indicating the position relationship between the point P and the respective points on the basis of functions f(X) and g(X) defined in section($0 \leqq X<1$) and section ($1 \leqq X<2$). Likewise, points ya, yb, yc and yd are expressed as Y on the basis of functions f(Y) and g(Y). The interpolation point P is thus obtained as:

$$P = xa\cdot ya\cdot A + xb\cdot ya\cdot B + xc\cdot ya\cdot C + xd\cdot ya\cdot D + xa\cdot yb\cdot E + xb\cdot yb\cdot F + xc\cdot yb\cdot G + xd\cdot yb\cdot H + xa\cdot yc\cdot J + xb\cdot yc\cdot K + xc\cdot yc\cdot L + xd\cdot yc\cdot M + xa\cdot yd\cdot N + xb\cdot yd\cdot Q + xc\cdot yd\cdot R + xd\cdot yd\cdot S$$

The enlarging or contracting (i.e., size change) of the image is performed when displaying or recording the image data. Specifically, when displaying the image data, the size is changed to meet the size of the image display part. When recording the image data, the size is changed to a recording image quality mode which has been preset at the time of the photography with an electronic camera. The compressor/decompressor 24 compresses the image data, for instance by JPEG (Joint Photographic Expert System) compression, for recording the data. The locations of the LPF 22 and the cubic operational part 23 may be interchanged.

Now, an example as a case of selecting enlarged/contracted size of image by operating the size selection switch 60, will be described with reference to FIG. 6. When ½ contracted size has been selected, In the above construction, the unit of data handled in the individual blocks is changed, for instance, from 27 bytes to 24 bytes in the Yc processor 21, from 24 bytes to 19 bytes in the LPF 22, and from 19 bytes to 8 bytes in the cubic operational part 23. In other words, data is transferred in 24 bytes from the Yc processor 21 to the LPF 22, in 19 bytes from the LPF 22 to the cubic operational part 23 and in 8 bytes from the cubic operational part 23 to the compressor/expander 24.

When doubly enlarged size is selected, the unit of data handled in the individual blocks is changed, for instance, from 15 bytes to 12 bytes in the Yc processor 21, from 12 bytes to 7 bytes in the LPF 22 and from 7 bytes to 8 bytes in the cubic operational unit 23.

As shown above, where the present invention is applied to the data transfer between adjacent ones of processing blocks, reliable and efficient data transfer between adjacent processing blocks is obtainable. Thus, even where the unit of data transfer is different with the individual blocks, it is possible to construct an image processor, which is subject to less time lag and free from waste. Where the processes in the above individual processing blocks are to be implemented with a single CPU, the request signal DQ and the reservation signal RS may be on-off operated by determining the data transfer unit according to the processing such as to ensure reliable data transfer.

In the case of FIG. 6, it is conceivable to dispense with the LPF processing by selecting the doubly enlarged size as the enlarged/contracted size. In this case, the unit of data handled in the in divisional blocks is changed, for instance, from 10 bytes to 7 bytes in the Yc processor 21, none in the LPF 22, the processing in which is skipped, and from 7 bytes to 8 bytes in the cubic operational unit 23.

For skipping the processing in a certain one of the serially connected blocks, the individual blocks are adapted to be selectively connected via a selector which selects processing or non-processing. As shown in FIG. 9, it is possible to select the sequence and combination of the processings of blocks as desired by selecting the connections to the preceding and succeeding blocks of the respective blocks via the selector 25. For example, it is possible to perform the above operation without the LPF by the use of the selector 25 such that the selector 25 selects serial connection of the path (O21) of DQ, RS, DC and DATA from the Yc processor 21 to the succeeding block, and selects serial connection of the path (I22) of DQ, RS, DC and DATA from the cubic operational unit 23 to the preceding block. Similarly, The selector 25 selects serial connection of the paths of DQ, RS, DC and DATA from the cubic operational unit 23 to the succeeding block and from the compressing/decompressing unit 24 to the preceding block. Block connection state of other embodiment for selecting the connections for the blocks by the selector 25 is described in FIG. 10.

Figure 11:
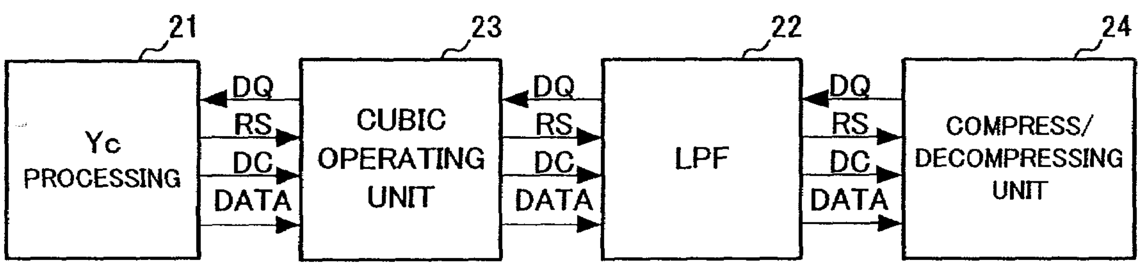
FIG. 11 is a drawing showing the block connection state according to the embodiment of the present invention.
Figure 12:
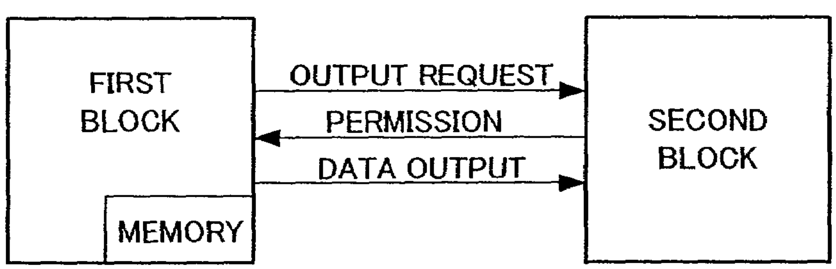
FIG. 12 is a block diagram showing a prior art data transmission method between the blocks.

The block processing sequence may be changed by selecting the block connection via the selector 25 with the above similar structure. FIG. 11 shows the block connection state when the processing sequences of the LPF 22 and the cubic operation unit 23 are exchanged.

According to the above structure, appropriate processing block may be selected and connected on the basis of mode and processing. Thus, enhanced freedom of design and better processing efficiency are obtainable. In this case, naturally the processing in each block is controlled on the basis of unit of data in correspondence to the combination of the selectively connected blocks.

Figure 10:
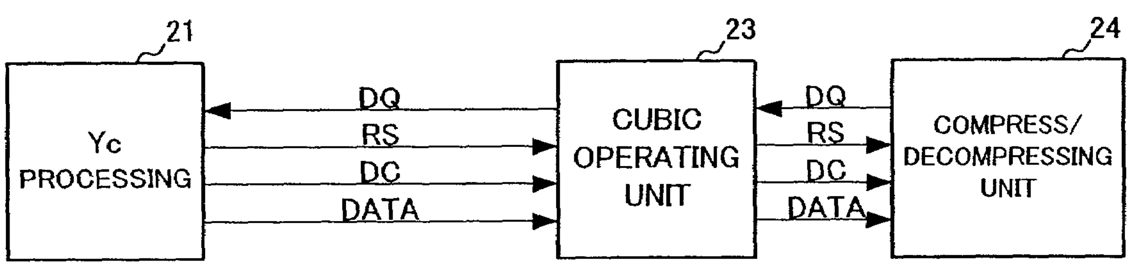
FIG. 10 is a drawing showing the block connection state according to the embodiment of the present invention.

In FIG. 10, although the input of Yc processor unit 21 and the output of compressor/decompressor 24 are not controlled by the selector 25, these block switching function of the input and output may be provided in the selector 25.

As has been shown, according to the present invention it is possible to obtain efficient and effective data transfer between adjacent data processing blocks and construct a system free from waste.

The above embodiment of the present invention is by no means limitative. For example, while the reservation signal RS has been described to be one block, this is by no means limitative; it is possible to chose any length of this signal so long as the chosen length is less than the length of the data certification signal DC.

Also, while the above embodiment has been described in connection with the case where the quantity of requested data pertaining to the request signal outputted to the first block and the quantity of transmitted data pertaining to the reservation signal outputted from the second block are the same, this is by no means limitative. That is, the transmitted data quantity and the requested data quantity may of course be different so long as the transmitted data quantity can be received. The transmitted data quantity may be greater than the requested data quantity because the vacant capacity for receiving the data outputted form the second block can be forecast so long as the data is being outputted.

Furthermore, while the above embodiment has been described in connection with the case the data unit is different in dependence on the contents of processes in the individual processing blocks, it is possible as well to preset a fixed data length for all the processes.

Further changes and modifications are of course possible without departing from the scope of the present invention.

As has been described in the foregoing, according to the present invention the data which can be received by the preceding block from the succeeding block is requested, and is transmitted (i.e., preserved) from the preceding block to the succeeding block in response to the request, and there is no case where the writing of the succeeding block is unable at the transmission time. It is thus possible to obtain reliable and efficient data transfer between adjacent blocks. Also, no extra memory need be provided for the case of the transmission failure in the output stage. The blocks may be data transfer buffers, or actually they may be processing blocks for executing such operations as image processing. Such processing blocks preferably process data for every predetermined line as in the image processing.

The data request can be outputted when and only when data can be received at the time of receiving a processing start command, and it can be stopped (or interrupted or ended) when the processing is ended or when the quantity of data that can be received becomes less than the quantity of transmitted data. With this arrangement, data transfer is never disabled before its end, and reliable data transfer is obtainable. In addition, with the arrangement that a data request can be outputted even when the quantity of data that can be received becomes less than the quantity of the transmitted data so long as the data is being outputted, the time lag between adjacent data transmissions can be eliminated, permitting efficient data transfer.

Furthermore, the data output reservation is performed in response to a data transfer request and also when it is ready to transfer the data. That is, it is possible to eliminate the possibility of transferring data in spite of the fact that it is not ready to transfer data or in spite of the absence of vacant capacity in the destination of the transfer. Reliable data transfer thus can be ensured. Still further, the outputting of the reservation signal is prohibited when no data transfer request prevails. Thus, it is not possible that data is erroneously transferred in spite of the absence of vacant capacity. Yet further, even when data to be transmitted is not fully ready in the first block, so long as data is being inputted thereto it is possible to obtain reliable data transfer without time lag by permitting the data output (i.e., turning on the reservation signal) at the time when one unit of such transfer data that can be transferred in one output cycle is ready to a certain extent.

The transfer unit of transfer data requested from the second block may be different from the transfer unit of data outputted from the first block, and the timings of the data transfer request and the data transfer reservation may be preset data to be transferred from the first block can be reliably transferred to the second block. In this case, particularly in the case of image data, the processing unit is different in the individual sets, and preferably the quantity of transfer data corresponding to each processing unit is chosen as the transfer unit.

Moreover, since the first block outputs the output data in correspondence to the reservation signal, the vacant capacity never becomes absent in the second block. Thus, reliable data transfer can be ensured. The system as described permits reliable and optimized data transfer between two blocks, and it is thus best suited for reliable and efficient block data transfer in the case with a plurality of blocks serially connected.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A data transmission system in which data is transmitted from a first block to a second block, comprising:

a requesting means for notifying, from the second block, a request of receiving data from the first block at least in predetermined units thereto;

a reserving means for notifying, from the first block, a readiness of outputting data to the second block, in predetermined units thereto; and a data outputting means for outputting, from the first block, data to the second block on the basis of the notifications from the requesting means and the reserving means, wherein even when the data reception capability of the second block is less than predetermined units, the requesting means outputs a request signal upon exceeding of a predetermined value by the data reception capability of the second block so long as data outputted from the second block prevails.

2. The data transmission system according to claim 1, wherein the first and second blocks each include either a buffer for transferring data or a processing block for operationally processing input data.

3. The data transmission system according to claim 1, wherein the requesting means notifies a request when it is possible to receive data in excess of predetermined units.

4. The data transmission system according to claim 1, wherein the requesting means refrains from sending out any request notification when processing in the second block has been ended or the input of data in excess of predetermined units is not permitted.

5. The data transmission system according to claim 1, wherein the reserving means sends out the readiness notification to the second block when a request of receiving data is notified from the data requesting means and data output in predetermined units is permitted.

6. The data transmission system according to claim 1, wherein the reserving means refrains from sending out any request notification to the second block when no request of receiving data has been notified from the requesting means.

7. The data transmission system according to claim 1, wherein the first block or the second block is capable of executing at least an image processing operation.

8. The data transmission system according to claim 1, wherein the requesting means requests data in first predetermined units, and the reserving means outputs data in second predetermined units different from the first predetermined unit.

9. The data transmission system according to 1, which further comprises a mode setting means for setting a transmission mode corresponding to the kind of data to be transmitted, the units of the data in the first predetermined unit and the data in the second predetermined unit being set on the basis of a mode set in the mode presetting means.

10. The data transmission system according to claim 1, wherein the data outputting means outputs data for every second predetermined unit in response to the notification from the reserving means.

11. The data transmission system according to claim 1, wherein a plurality of blocks including the first and second blocks are cascade connected in a row.

12. The data transmission system according to claim 1, wherein the data outputting means outputs, together with data, a data certification signal.

13. A data transmission system in which data is transmitted from a first block to a second block, comprising:

a requesting means for notifying, from the second block, a request of receiving data from the first block at least in predetermined units thereto;

a reserving means for notifying, from the first block, a readiness of outputting data to the second block, in predetermined units thereto; and a data outputting means for outputting, from the first block, data to the second block on the basis of the notifications from the requesting means and the reserving means, wherein even when a predetermined value has not been reached by the quantity of data capable of being outputted from the first block, the reserving means outputs a reservation signal upon exceeding of a predetermined value, during the reception by the first block of the data outputted from the second block, by the output data.

14. An electronic camera in which data transmission system in which data is transmitted from a first block to a second block, comprising:

a requesting means for notifying from the second block, a request of receiving data from the first block at least in predetermined units thereto;

a reserving means f or notifying, from the first block, the readiness of outputting data to the second block, in predetermined units thereto; and a data outputting means for outputting, from the first block, data to the second block on the basis of the notifications from the requesting means and the reserving means, wherein even when the data reception capability of the second block is less than predetermined units, the requesting means outputs a request signal upon exceeding of a predetermined value by the data reception capability of the second block so long as data outputted from the second block prevails.

15. The electronic camera according to claim 14, further comprising a selector for selecting or connection switching a block to be connected to the first block among a plurality of image processing blocks and setting the selected block to be the second block.

16. An electronic camera in which data transmission system in which data is transmitted from a first block to a second block, comprising:

a requesting means for notifying from the second block, a request of receiving data from the first block at least in predetermined units thereto;

a reserving means for notifying, from the first block, the readiness of outputting data to the second block, in predetermined units thereto; and a data outputting means for outputting, from the first block, data to the second block on the basis of the notifications from the requesting means and the reserving means, wherein even when a predetermined value has not been reached by the quantity of data capable of being outputted from the first block, the reserving means outputs a reservation signal upon exceeding of a predetermined value, during the reception by the first block of the data outputted from the second block, by the output data.

17. The electronic camera according to claim 16, further comprising a selector for selecting or connection switching a block to be connected to the first block among a plurality of image processing blocks and setting the selected block to be the second block.

18. A data transmission method in which data is transmitted from a first block to a second block, the method comprising:

sending, from the second block, a request of receiving data from the first block at least in predetermined units thereto;

sending, from the first block, a notification of a readiness of outputting data to the second block, in predetermined units thereto; and outputting, from the first block, data to the second block on the basis of the request and the notification, wherein even when the data reception capability of the second block is less than predetermined units, the request is output upon exceeding of a predetermined value by the data reception capability of the second block so long as data outputted from the second block prevails.

19. A data transmission method in which data is transmitted from a first block to a second block, comprising:

sending, from the second block, a request of receiving data from the first block at least in predetermined units thereto;

sending, from the first block, a notification of a readiness of outputting data to the second block, in predetermined units thereto; and outputting, from the first block, data to the second block on the basis of the request and the notification, wherein even when a predetermined value has not been reached by the quantity of data capable of being outputted from the first block, the notification is output upon exceeding of a predetermined value, during the reception by the first block of the data outputted from the second block, by the output data.

20. An electronic camera data transmission method in which data is transmitted from a first block to a second block, the method comprising:

sending, from the second block, a request of receiving data from the first block at least in predetermined units thereto;

sending, from the first block, a notification of a readiness of outputting data to the second block, in predetermined units thereto; and outputting, from the first block, data to the second block on the basis of the request and the notification, wherein even when the data reception capability of the second block is less than predetermined units, the request is output upon exceeding of a predetermined value by the data reception capability of the second block so long as data outputted from the second block prevails.

21. An electronic camera data transmission method in which data is transmitted from a first block to a second block, comprising:

sending, from the second block, a request of receiving data from the first block at least in predetermined units thereto;

sending, from the first block, a notification of a readiness of outputting data to the second block, in predetermined units thereto; and outputting, from the first block, data to the second block on the basis of the request and the notification, wherein even when a predetermined value has not been reached by the quantity of data capable of being outputted from the first block, the notification is output upon exceeding of a predetermined value, during the reception by the first block of the data outputted from the second block, by the output data.

* * * * *